United States Patent [19]
Brattsand et al.

[11] 3,929,768
[45] Dec. 30, 1975

[54] STEROIDS, PROCESSES FOR THEIR MANUFACTURE AND PREPARATIONS CONTAINING SAME

[75] Inventors: Ralph Lennart Brattsand; Bo Thuresson af Ekenstam, both of Molndal; Karl Göran Claeson, Goteborg; Bror Arne Thalén, Molndal, all of Sweden

[73] Assignee: AB Bofors, Bofors, Sweden

[22] Filed: May 14, 1973

[21] Appl. No.: 360,051

[30] Foreign Application Priority Data
May 19, 1972 Sweden.............................. 6644/72

[52] U.S. Cl........................................ 260/239.55 D
[51] Int. Cl.²......................................... C07J 17/00
[58] Field of Search........................... 260/239.55 D

[56] References Cited
UNITED STATES PATENTS

| | | | |
|---|---|---|---|
| 3,048,581 | 8/1962 | Fried................ | 260/239.55 |
| 3,128,238 | 4/1964 | Mallett.............. | 195/51 |
| 3,133,940 | 5/1964 | Oughton et al...... | 260/397.45 |

FOREIGN PATENTS OR APPLICATIONS
933,867  8/1963  United Kingdom........ 260/239.55 D OTHER PUBLICATIONS
Herzog et al., Tetrahedron, Vol. 18, 1962, pp. 581–586.

*Primary Examiner*—Elbert L. Roberts
*Attorney, Agent, or Firm*—Gordon W. Hueschen

[57] ABSTRACT

Novel steroids having the general formula:

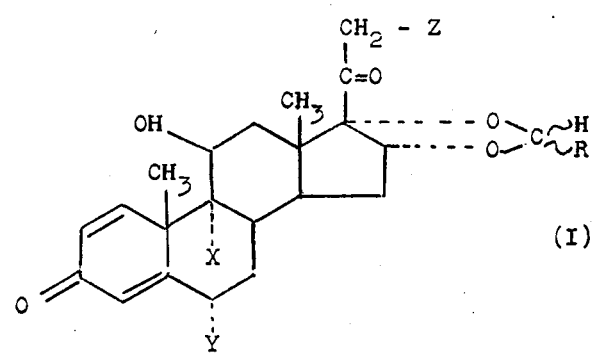

wherein X and Y are independently selected from hydrogen and fluorine, X being selected from hydrogen and fluorine when Y is hydrogen and X being fluorine when Y is fluorine, Z is selected from hydroxyl and esterified hydroxyl preferably containing a maximum of 12 carbon atoms, if any, in the esterifying group, R is selected from straight and branched hydrocarbon chains having 2–10 carbon atoms; processes for the preparation of said steroids; compositions containing said steroids; and method of treating inflammation therewith. The steroids are physiologically active compounds possessing antiinflammatory activity.

29 Claims, No Drawings

STEROIDS, PROCESSES FOR THEIR MANUFACTURE AND PREPARATIONS CONTAINING SAME

The present invention refers to new physiologically active steroids, to processes for their manufacture, to preparations containing such steroids, and to method of treating inflammation therewith. The new physiologically active steroids according to the invention have the general formula:

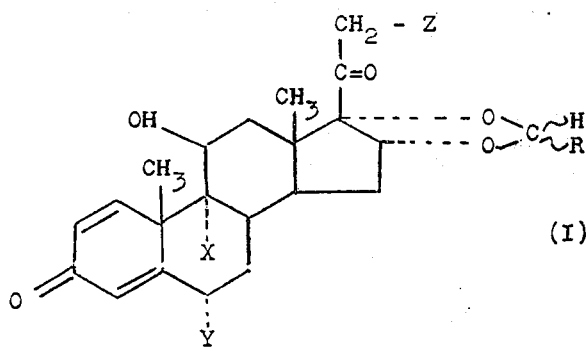

wherein X and Y are independently selected from hydrogen and fluorine, X being selected from hydrogen and fluorine when Y is hydrogen and X being fluorine when Y is fluorine, Z is selected from hydroxyl and esterified hydroxyl preferably containing a maximum of 12 carbon atoms, if any, in the esterifying group, R is selected from straight and branched hydrocarbon chains having 2–10 and preferably 2–6 carbon atoms.

The above-mentioned steroids may be prepared by reacting a steroid having the general formula:

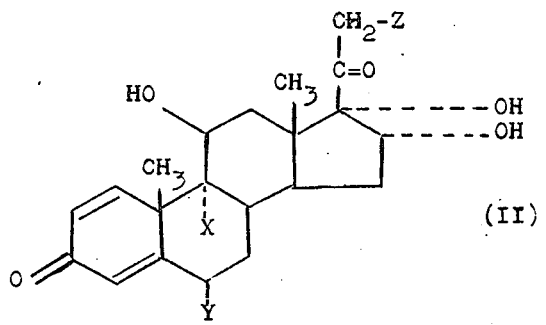

with an aldehyde having the general formula

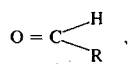

wherein R has the meaning given above, to the formation of desired steroid having formula (I) above, whereby if in the steroid obtained Z is hydroxyl, said hydroxyl is possibly esterified. The esterification may be carried out with a fatty acid with a straight or branched hydrocarbon chain having 1–12 carbon atoms, such fatty acid being for instance: acetic acid, propionic acid, butyric acid, valeric acid, isovaleric acid, trimethyl acetic acid, hexanoic acid, tert.-butyl acetic acid, octanoic acid, or with a heterocyclic carboxylic acid, such as pyridine-3-, pyridine-4-, benzofuran-2-carboxylic acids or a menthoxymethyl carboxylic acid. To prepare water-soluble steroid derivatives the esterification is suitably carried out with dicarboxylic acids, preferably having 2–12 carbon atoms, or with phosphoric or sulphuric acids.

The reaction between the starting compound II and the carbonyl compound is suitably carried out by adding the steroid II to a solution of the carbonyl compound together with an acid catalyst for instance perchloric acid, p-toluene sulphonic acid, hydrochloric acid etc., in dioxane or equivalent solvent, the reaction mixture being then taken up in methylene chloride and neutralized and the acetal derivative formed being isolated and purified by gel filtration on a suitable material, for instance cross-linked dextrane gels of Sephadex LH-type or copolymers of vinyl acetate, suchas Merckogel OR-PVA, in equilibrium with suitable solvents, for instance halogen hydrocarbons, ethers or esters, such as ethyl acetate, chloroform, methylene chloride, ethylene chloride, tetrahydrofurane and dioxane.

To prepare the particularly useful 21-acyloxy derivatives the free acid, its halogenide or anhydride may be used in the esterification.

For the preparation of the 21-phosphate derivatives phosphoroxy chloride in the presence of a tertiary base, for instance pyridine-3-ethylamine or the like, is used. The intermediary chloride formed is hydrolyzed with water in the presence of the same tertiary base. If it is desired, the 21-phosphate may be converted to its alkali salt by means of an alkali metal hydroxide, such as sodium or potassium hydroxide, or an alkali metal carbonate, such as sodium or potassium carbonate.

All of the steroids of the instant disclosure may, if desired, be separated in their stereo isomers by gel filtration on a suitable material in conformity with ........... Ser. No. 359,913 filed simultaneously herewith. The stereo isomery is due to the space orientation about the 2'-carbon atom of the dioxolane ring.

The invention will now be further illustrated by non-limiting examples. In the examples there is used for the chromatography a column having a length of 85 cm, an inner diameter of 2.5 cm, the flow rate being 1 ml/min. The molecular weights are determined by mass spectroscopy. The retention volumes given in the examples refer to the use of chloroform as an eluant. All the melting points are determined by means of a Reichert melting point microscope, and all derivatives melt under decomposition.

EXAMPLE 1.

16α, 17α-(2'-Hydrogen-2'-ethyl) methylene dioxy-9-fluoropregna-1,4-diene-11β,21-diol-3,20-dione.

To a solution of 59.0 mg newly distilled propion aldehyde and 0.1 ml 72 % perchloric acid in 30 ml thoroughly purified and dried dioxane 200.0 mg of triamcinolon were added in portions for 30 minutes. The reaction mixture was then allowed to stand for further 5.5 hours at room temperature under stirring and was then diluted with 200 ml methylene chloride. The solution was washed twice with a 15 % potassium bicarbonate solution and then three times with water and dried. The solvents were evaporated in vacuum, the residue was taken up in ether and precipitated with petroleum ether. The dried crude product (220.0 mg) was chromatographed on a column packed with hydroxy-propylated, cross-linked dextran gel (Sephadex LH 20, molecular weight range 100–4000; Pharmacia Fine Chemicals, Uppsala, Sweden) using chloroform as an eluant, the retention volume being 840–990 ml. This resulted in 174.6 mg (79 %) pure isomer mixture having the following characteristics: Melting point about 155°–97°C; $[\alpha]_D^{25} = +97.5°$ (c=0.2 in $CH_2Cl_2$); molecular weight = 434 (theor. 434.5 ).

Similar separation results were obtained by using a gel of copolymers of vinyl acetate (Merckogel OR-PVA 2000, molecular weight range up to 1000), as well as using, in addition to chloroform, methylene chloride, ethylene chloride, ethyl acetate, tetrahydrofurane and dioxane as eluants for both types of gel materials.

EXAMPLES 2–12.

In a manner analogous to that described in Example 1 the substances given in Tables 1–3 below were prepared, purified and chromatographed.

dissolved in 1 ml of dry dioxane. The reaction mixture was allowed to stand under stirring at room temperature over night, the main part of the solvents were evaporated in vacuum and the residue was poured into 20 ml of 3 % ammonium chloride solution. The precipitate obtained was separated by centrifugation and dissolved in 75 ml of chloroform. The chloroform solution was washed once with 15 % sodium bicarbonate solution, three times with water, dried over magnesium sulphate and evaporated in vacuum. The residue was dissolved in ether and precipitated with petroleum ether. The dried, solid crude product (54.5 mg) was chromatographed on Sephadex LH-20 using chloroform as an eluant. The retention volume was 372–420 ml. This resulted in 48.5 mg (73 %) 21-benzofurane-2-carboxylic ester of a pure isomeric mixture of the desired compound having the following characteristics: Melting point about 175°–90°C; $[\alpha]_D^{25} = + 150.2°$ (c=0.2 in $CH_2Cl_2$); molecular weight = 592 (theor. 592.7).

EXAMPLES 14–36.

In a manner analogous to that described in Example 13 the 21-esters of the compounds prepared in Exam-

Table 1.

| Example No. | 16α, 17α-derivative of triameinolone with: | $[\alpha]_D^{25}$ (c=0.2 in $CH_2Cl_2$)° | Mp. °C | Molecular weight, found: | calculated: | Retention volume mls |
|---|---|---|---|---|---|---|
| 2 | n-butyraldehyde | + 94.0 | 130–45 | 448 | 448.5 | 822–984 |
| 3 | n-valeric aldehyde | + 86.4 | 96–108 | 462 | 462.6 | 780–924 |
| 4 | n-caproic aldehyde | + 82.3 | 94–100 | 476 | 476.6 | 702–828 |
| 5 | n-decylaldehyde | + 76.4 | 70–80 | 532 | 532.7 | 540–630 |

Table 2.

| Example No. | 16α, 17α-derivative of fluocinolone with: | $[\alpha]_D^{25}$ (c=0.2 in $CH_2Cl_2$)° | Mp. °C | Molecular weight, found: | calculated: | Retention volume mls |
|---|---|---|---|---|---|---|
| 6 | n-butyraldehyde | + 88.3 | 155–65 | 476 | 476.5 | 1130–1320 |
| 7 | n-caproic aldehyde | + 83.6 | 150–7 | 494 | 494.6 | 870–1000 |
| 8 | n-caprylic aldehyde | + 73.1[1] | 117–30 | 522 | 522.6 | 750–850 |

[1] c = 0.1 in $CH_2Cl_2$

Table 3.

| Example No. | 16α, 17α-derivative of prednacinolone with: | $[\alpha]_D^{25}$ (c=0.2 in $CH_2Cl_2$)° | Mp. °C | Molecular weight, found: | calculated: | Retention volume mls |
|---|---|---|---|---|---|---|
| 9 | n-butyraldehyde | +96.9 | 215–22 | 430 | 430.5 | 456–540 |
| 10 | n-caproic aldehyde | +87.3 | 190–4 | 458 | 458.6 | 414–498 |
| 11 | n-caprylic aldehyde | +82.0 | 75–90 | 486 | 486.7 | 372–420 |
| 12 | n-decylaldehyde | +79.1 | 65–80 | 514 | 514.7 | 336–390 |

EXAMPLE 13.

16α, 17α-(2'-hydrogen-2'-n-propyl)methylene dioxy-11β-hydroxy-21-(benzofurane-2-carbonyloxy)-9-fluorpregna-1,4-diene-3,20-dione.

A solution of 50.0 mg of 16α, 17α-(2'-hydrogen-2'-n-propyl)-methylenedioxy-9-fluorpregna-1,4-diene-11β,21-diol-3,20-dione in 2 ml dry pyridine was added to 56.4 mg benzofurane-2-carboxylic acid chloride ples 1–12 and shown in Table 4 below were prepared, purified and chromatographed.

The acid chlorides used for the esterification are abbreviated in Table 4 in the following manner:

NAC = nicotinic acid chloride
IAC = isonicotinic acid chloride
AAC = acetyl chloride
VAC = valeric acid chloride
BAC = benzofurane-2-carboxylic acid chloride.

Table 4.

| Example No. | the 21-ester of the compound of Ex. No. | with | $[\alpha]_D^{25}$ (c=0.2 in $CH_2Cl_2$)° | Mp. °C | Molecular weight found: | Molecular weight calculated: | Retention volume, mls |
|---|---|---|---|---|---|---|---|
| 14 | 2 | NAC | + 119.4 | 212–35 | 553 | 553.6 | 342–420 |
| 15 | 2 | IAC | + 115.5 | 198–201 | 553 | 553.6 | 320–380 |
| 16 | 2 | AAC | + 83.3 | 216–34 | 490 | 490.6 | 310–360 |
| 17 | 2 | VAC | + 88.2 | 224–43 | 532 | 532.7 | 270–315 |
| 18 | 4 | VAC | + 79.3 | 189–97 | 560 | 560.7 | 235–80 |
| 19 | 5 | VAC | + 71.8 | 162–63 | 616 | 616.8 | 234–58 |
| 20 | 6 | BAC | + 138.9 | 197–200 | 610 | 610.7 | 282–348 |
| 21 | 6 | NAC | + 108.3 | 187–99 | 571 | 571.6 | 282–348 |
| 22 | 6 | AAC | + 78.8 | 260–78 | 508 | 508.6 | 335–395 |
| 23 | 6 | VAC | + 81.2 | 238–45 | 550 | 550.7 | 270–306 |
| 24 | 7 | AAC | + 73.0 | 250–55 | 536 | 536.6 | 336–84 |
| 25 | 8 | VAC | + 69.2 | 192–98 | 606 | 606.8 | 245–75 |
| 26 | 9 | BAC | + 142.9 | 120–30 | 574 | 574.7 | 230–270 |
| 27 | 9 | NAC | + 120.6 | 110–25 | 535 | 535.6 | 275–340 |
| 28 | 9 | AAC | + 86.2 | 157–63 | 472 | 472.6 | 240–65 |
| 29 | 9 | VAC | + 93.9 | 166–78 | 514 | 514.7 | 220–50 |
| 30 | 10 | VAC | + 83.3 | 177–87 | 542 | 542.7 | 222–46 |
| 31 | 11 | BAC | + 112.2 | 103–12 | 658 | 658.8 | 204–28 |
| 32 | 11 | AAC | + 78.4 | 185–7 | 528 | 528.7 | 225–50 |
| 33 | 11 | VAC | + 77.4 | 153–4 | 570 | 570.8 | 216–46 |
| 34 | 12 | BAC | + 123.5 | 79–90 | 658 | 658.8 | 198–222 |
| 35 | 12 | AAC | + 75.2 | 142–5 | 556 | 556.7 | 215–35 |
| 36 | 12 | VAC | + 96.7 | 108–10 | 598 | 598.8 | 195–225 |

EXAMPLE 37.

The 21-disodium phosphate of 16α, 17α-(2'-hydrogen-2'-n-propyl)methylenedioxy-9-fluorpregna-1,4-diene-11β,21-diol-3,20-dione.

To a solution of 0.016 ml newly distilled phosphoroxychloride in 2.0 ml of dry pyridine a solution of 40.0 mg of 16α,17α-(2'-hydrogen-2'-n-propyl)methylenedioxy-9-fluorpregna-1,4-diene-11β, 21-diol-3,20-dione (II) in 2.0 ml of dry pyridine was added under stirring at −26°C. The temperature was allowed to rise to −10°C, whereafter the reaction mixture was allowed to stand a few minutes in the cold. Water (0.16 ml) was added drop-wise, the temperature not being allowed to exceed −10°C. After 13 minutes the pyridine was evaporized in vacuum, the residue was taken up in chloroform and the chloroform solution was extracted three times with water. The water phase was neutralized with 1.4 ml of 5 % sodium carbonate solution to pH 7.0 and freeze-dried. The solid substance (95.3 mg) was taken up in dry methanol and the insoluble part was separated by centrifugation. The methanol solution was treated with excess of Dowex 50W-X8 (H-form), (this material is a cation exchange resin consisting of a copolymer of styrene and divinyl benzene (8 %) and sold by Dow Chemical Company, USA), filtrated and transferred to a column packed with Sephadex LH-20 (length 80 cm, inner diameter 25 mm) and eluated (flow rate 1 ml/min.) with methanol of weak sulphuric acid acidity (Retention volume 255–330 ml). The methanol was evaporated in vacuum, the residue was taken up in water, neutralized to pH 7.0 with 5 % sodium carbonate solution and freeze-dried.

The resulting solid substance was slurried in dry methanol. The methanol solution was centrifugated and evaporized to 1 ml and petroleum ether was then added. This resulted in 22.7 mg (45 %) of 21-disodiumphosphate of 16α,17α-(2'-hydrogen-2'-n-propyl)-methylenedioxy-9-fluorpregna-1,4-diene-11β,21-diol-3,20-dione with $R_f$=0.78 (thin layer chromatography on cellulose with isopropanol: ammonia:water 7:1:2).

Elementary analysis: Calculated for $C_{25}H_{32}O_9FPNa_2$ (572.488) C: 52.45; H: 5.63; P: 5.41. Obtained C: 51.87; H: 5.41; P: 5.59.

EXAMPLE 38.

The 21-disodium phosphate of 16α,17α-(2'-hydrogen-2'-n-propyl)methylene dioxy-6α,9-difluorpregna-1,4-diene-11β,21-diol-3,20-dione was obtained in a manner analogous to that described in Example 37 and showed the following data:

Retention volume: 250 - 305 ml $R_f$ = 0.69 (thin layer chromatography on cellulose with isopropanol:ammonia:water 7:1:2).

Elementary analysis: Calculated for $C_{25}H_{31}O_9F_2PNa_2$ (590,473). C: 50.85; H: 5.29; P: 5.25. Obtained C: 50.53; H: 5.12; P: 5.38.

Below there are given examples of galenic preparations prepared in a conventional manner:

Example 39. Ointment, fat, anhydrous.

| Steroid | 0.001 – 0.2 | |
|---|---|---|
| Cetanol | 5 | |
| Liquid paraffin | 20 | |
| Vaseline to | 100 | g |

Example 40. Cream.

| Steroid | 0.001 – 0.2 | |
|---|---|---|
| Monolein | 2.5 | |
| Wool fat | 5 | |
| Vaseline | 42 | |
| Citric acid | 0.3 | |
| Sodium citrate | 0.9 | |
| Water to | 100 | g |

Example 41. Liniment.

| Steroid | 0.001 – 0.2 | |
|---|---|---|
| Cetanol | 3.2 | |
| Stearol | 0.2 | |
| Polyoxyethylene sorbitane monolaurate | 2 | |
| Sorbitane monopalmitate | 0.5 | |
| Propylene glycol | 4.8 | |
| Metagin[a] | 0.08 | |
| Propagin | 0.02 | |
| Water to | 100 | g |

[a]methylester of parahydroxybenzoic acid

Example 42. Tincture.

| Steroid | 3 | – 500 mg |
|---|---|---|
| Ethanol 60 % to | 100 | ml |

Example 43. Suspension for injection.

| Steroid | 0.05 | – 10 mg |
|---|---|---|
| Sodium carboxymethyl cellulose | 7 | mg |
| Sodium chloride | 7 | mg |
| Tween 80[a] | 0.5 | mg |
| Phenyl carbinol | 8 | mg |
| Water, sterile to | 1 | ml |

[a]Polyoxyethylene(20)sorbitane monooleate.

-continued

Example 44. Foam aerosol.

| | |
|---|---|
| Steroid | 0.001 – 0.2 |
| Glycerol | 4 |
| N-cetylstearyl alcohol | 0.2 |
| Cetylstearyl alcohol | 3 |
| Isopropylmyristate | 2 |
| Metagin | 0.1 |
| Water | 80 |
| Tetrafluordichloroethane/ difluordichloromethane 40:60 to | 100 g |

All steroids of the instant invention are physiologically active compounds, possessing antiinflammatory activity. The antiinflammatory activity of the substances according to the invention was investigated in granulom test on rats subjected to adrenalectomy. The experimental procedure used corresponds largely to that described by G. Engelhardt: Arzneimittel-Forschung, 13, p. 588, 1963. According to this procedure the test substances are applied topically in the implanted cotton wads. It is thereby possible to study the local antiinflammatory effect in granuloma and also systemic effects in the form of retrogression of thymus and inhibition of bodyweight growth.

Young male rats of the Sprague-Dawley strain weighing about 110–130 g were subjected to adrenalectomy under ether narcosis. Two sterilized cotton wads of each about 6 mg were implanted simultaneously subcutaneously on the lateral side of the spinal. After awakening the animals were stored 5 per cage and were supplied with normal food and 1 % sodium chloride solution as drinking water. On the eighth test day the animals were sacrificed by ether narcosis. The granulomas formed around the cotton wads were carefully recovered and thymus and body weights were measured. The two granulomas from each animal were dried over night at 80°C and weighed. After subtraction of the initial weight of the cotton wads the weight increase was used as a measure of the granulom growth.

The test substances were used dissolved in ethyl acetate. Under aseptic conditions 0.05 ml of said solutions were injected into each of the cotton wads, whereafter the solvent was allowed to evaporate in desiccator. Normally 3 concentrations of each test substance with the standard doses 3.3, 30 and 270 γ/animal were investigated. Each test group normally comprised 10 rats. The cotton wads of the control group were injected with only ethyl acetate, but were in other respects treated in the same way. When considering the effects of the test substances the average values of granulom growth, thymus weight and body weight increase day 0–8 were measured in each group in absolute figures and in % of the corresponding figure of the control group. Dose-response curves were drafted and used for estimating the doses giving 50 % reduction of granulom growth and of thymus weight and 25 % decrease of body weight increase.

The results of testing the steroids according to the invention as per the procedure described above are summarized in table 5 below. From said table it is clear that the investigated compounds of the invention are physiologically active substances showing significantly stronger antiinflammatory effect than steroids of the prior art. The dose required for obtaining 50 % reduction of the granulom growth is lower for the compounds of the present invention than the corresponding dose of the reference substances triamcinolone acetonide, fluocinolone acetonide and prednocinolone acetonide, which substances have wide-spread use.

Moreover it is clear from the experimental data presented that the new compounds possess a better relation between the local antiinflammatory activity (inhibition of granulom growth) and systemic effects in the form of weight decrease of thymus and in the form of decreased body growth. With regard to the reference substances higher doses are required for obtaining 50 % reduction of granulom growth than for negatively effecting thymus and body weights. Contrary to this, for the new compounds of this invention a 50 % antiinflammatory activity was obtained at lower doses than the doses resulting in the systemic effects in question. Therefore, the new compounds of the invention show surprisingly a better relation betwen desirable main effect and nondesirable side effects.

The compounds may be used to treat inflammation in any living mammalian animal body by administering thereto an effective anti-inflammatory amount of the compound in any suitable form and by any suitable mode of administration, e.g. topically, orally, or parenterally, in the same manner as their parent compounds, but generally with greater efficiency and therefore generally in lower dosages and according to somewhat lower dosage regimens.

As representative of living animal bodies which may be treated with the compounds and compositions of the invention, and according to the method of treating of the invention, for alleviation of the same and/or similar conditions as those described, the following may be mentioned: domestic animals such as dogs and cats, farm animals such as horses, cows, sheep and goats.

Table 5.

Table summarizing biological effects of investigated compounds.

| Compound according to Ex. No. | Required dose γ/animal to obtain: | | 25% inhibition of Body weight increase |
|---|---|---|---|
| | 50% inhibition of | | |
| | Granuloma growth | Thymus weight | |
| Triamcinolone acetonide | 125 | 70 | 100 |
| 1 | 35 | 100 | 140 |
| 2 | 10 | >30 | >30 |
| 3 | <3 | 70 | 170 |
| 4 | 17 | 130 | >270 |
| 5 | <30 | >30 | >30 |
| Fluorocinolone acetonide | 50 | 14 | 20 |
| 6 | 5 | 10 | 50 |
| 7 | <3 | 25 | 30 |
| 8 | <30 | >30 | >30 |
| Prednacinolone acetonide | 270 | 105 | >270 |
| 9 | 100 | 80 | 80 |
| 10 | 10 | 175 | 90 |
| 11 | <30 | >270 | 30 |
| 12 | <30 | >270 | 270 |
| 13 | <3 | 25 | 20 |
| 14 | 7 | 35 | 10 |
| 15 | 15 | 17 | 25 |
| 16 | <3 | 30 | 20 |
| 17 | <7 | 50 | 30 |
| 20 | <3 | 10 | 10 |
| 21 | 10 | 30 | 20 |
| 22 | <3 | 10 | 5 |
| 26 | <3 | 60 | 40 |
| 27 | 3 | 90 | 70 |
| 29 | <3 | 60 | 20 |

Particularly preferred compounds are:

Ex. 2 16α,17α-(2'-hydrogen-2'-n-propyl)methylenedioxy-9-fluorpregna-1,4-diene-11β,21-diol-3,20-dione.

Ex. 3 16α,17α-(2'-hydrogen-2'-n-butyl)methylenedioxy-9-fluorpregna-1,4-diene-11β,21-diol-3,20-dione.

Ex. 6 16α,17α-(2'-hydrogen-2'-n-propyl)methylenedioxy-6α,9-difluorpregna-1,4-diene-11β,21-diol-3,20-dione.

Ex. 7 16α,17α-(2'-hydrogen-2'-n-pentyl)methylenedioxy-6α,9-difluorpregna-1,4-diene-11β,21-diol-3,20-dione.

Ex. 10 16α,17α-(2'-hydrogen-2'-n-pentyl)methylenedioxy-pregna-1,4-diene-11β,21-diol-3,20-dione.

Ex. 14 16α,17α-(2'-hydrogen-2'-n-propyl)methylenedioxy-11β-hydroxy-21-nicotinoyloxy-9-fluorpregna-1,4-diene-3,20-dione.

Ex. 16 16α,17α-(2'-hydrogen-2'-n-propyl)methylenedioxy-11β-hydroxy-21-acetoxy-9-fluorpregna-1,4-diene-3,20-dione.

Ex. 20 16α,17α-(2'-hydrogen-2'-n-propyl)methylenedioxy-11β-hydroxy-21-(benezofurane-2-carbonyloxy)-6α,9-difluorpregna-1,4-diene-3,20-dione.

Ex.22 16α,17α-(2'-hydrogen-2'-n-propyl)methylenedioxy-11β-hydroxy-21-acetoxy-6α,9-difluorpregna-1,4-diene-3,20-dione.

Ex.26 16α,17α-(2'-hydrogen-2'-n-propyl)methylenedioxy-11β-hydroxy-21-(benzofurane-2-carbonyloxy)pregna-1,4-diene-3,20-dione.

Ex.29 16α,17α-(2'-hydrogen-2'-n-propyl)methylenedioxy-11β-hydroxy-21-valeroyloxypregna-1,4-diene-3,20-dione.

What is claimed is:

1. 2'-unsymmetrical-stereoisometric mixtures of 16,17 alkylenedioxy steroids having the general formula:

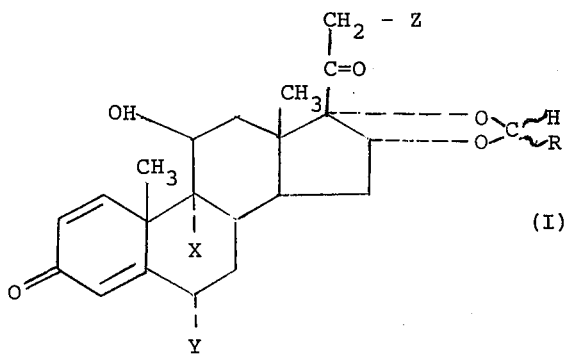

(I)

wherein X and Y are independently selected from hydrogen and fluorine, X being selected from hydrogen and fluorine when Y is hydrogen and X being fluorine when Y is fluorine, Z is selected from hydroxyl and esterified hydroxyl wherein the hydroxyl group is esterified with a member of the group consisting of phosphoric and sulphuric acids, dicarboxylic acids having 2 – 12 carbon atoms, pyridine-3-carboxylic acid, pyridine-4-carboxylic acid, benzofurane-2-carboxylic acid, and menthoxymethylcarboxylic acid, and loweralkanoic acids having up to a maximum of 8 carbon atoms, and R is selected from straight and branched hydrocarbon chains having 2 – 10 carbon atoms.

2. Steroids according to claim 1, wherein R is selected from straight and branched hydrocarbon chains having 2–6 carbon atoms.

3. Steroids according to claim 1, wherein X is fluorine and Z is hydroxyl.

4. Steroids according to claim 3, wherein Y is fluorine.

5. Steroids according to claim 1, wherein Z is hydroxyl esterified with an acid selected from acetic acid, propionic acid, butyric acid, valeric acid, isovaleric acid, trimethylacetic acid, hexanoic acid, tert.butyl acetic acid and octanoic acid.

6. Steroids according to claim 1, wherein Z is hydroxyl esterified with an acid selected from pyridine-3-, pyridine-4-, benzofurane-2-carboxylic acid and menthoxymethylcarboxylic acid.

7. Steroids according to claim 1, wherein Z is hydroxyl esterified with an acid selected from dicarboxylic acids, having 2–12 carbon atoms.

8. Steroids according to claim 1, wherein Z is hydroxyl esterified with an acid selected from phosphoric and sulphuric acids.

9. Steroid according to claim 1, which is 16α,17α-(2'-hydrogen-2'-n-propyl)methylenedioxy-9-fluorpregna-1,4-diene-11β,21-diol-3,20-dione.

10. Steroid according to claim 1, which is 16α,17α-(2'-hydrogen-2'-n-butyl)methylenedioxy-9-fluorpregna-1,4-diene-11β,21-diol-3,20-dione.

11. Steroid according to claim 1, which is 16α,17α-(2'-hydrogen-2'-n-propyl)methylenedioxy-6α,9-difluorpregna-1,4-diene-11β,21-diol-3,20-dione.

12. Steroid according to claim 1, which is 16α,17α-(2'-hydrogen-2'-n-pentyl)methylenedioxy-6α,9-difluorpregna-1,4-diene-11β,21-diol-3,20-dione.

13. Steroid according to claim 1, which is 16α,17α-(2'-hydrogen-2'-n-pentyl)methylenedioxy-pregna-1,4-diene-11β,21-diol-3,20-dione.

14. Steroid according to claim 1, which is 16α,17α-(2'-hydrogen-2'-n-propyl)methylenedioxy-11β-hydroxy-21-nicotinoyloxy-9-fluorpregna-1,4-diene-3,20-dione.

15. Steroid according to claim 1, which is 16α,17α-(2'-hydrogen-2'-n-propyl)methylenedioxy-11β-hydroxy-21-acetoxy-9-fluorpregna-1,4-diene-3,20-dione.

16. Steroid according to claim 1, which is 16α,17α-(2'-hydrogen-2'-n-propyl)methylenedioxy-11β-hydroxy-21-(benzofurane-2-carbonyloxy)-6α,9-difluorpregna-1,4-diene-3,20-dione.

17. Steroid according to claim 1, which is 16α,17α-(2'-hydrogen-2'-n-propyl)methylenedioxy-11β-hydroxy-21-acetoxy-6α,9-difluorpregna-1,4-diene-3,20-dione.

18. Steroid according to claim 1, which is 16α,17α-(2'-hydrogen-2'-n-propyl)methylenedioxy-11β-hydroxy-21-(benzofurane-2-carbonyloxy)pregna-1,4-diene-3,20-dione.

19. Steroid according to claim 1, which is 16α,17α-(2'-hydrogen-2'-n-propyl)methylenedioxy-11β-hydroxy-21-valeroyloxypregna-1,4-diene-3,20-dione.

20. Steroid according to claim 1, which is 16α,17α-(2'-hydrogen-2'-ethyl)methylenedioxy-9-fluorpregna-1,4-diene-11β,21-diol-3,20-dione.

21. Steroid according to claim 1, which is 16α,17α-(2'-hydrogen-2'-n-pentyl)methylenedioxy-9-fluorpregna-1,4,diene-11β,21-diol-3,20-dione.

22. Steroid according to claim 1, which is 16α,17α-(2'-hydrogen-2'-n-propyl)methylenedioxy-11β-hydroxy-21-(benzofurane-2-carbonyloxy)-9-fluorpregna-1,4-diene-3,20-dione.

23. Steroid according to claim 1, which is 16α,17α-(2'-hydrogen-2'-n-propyl)methylenedioxy-11β-hydroxy-21-isonicotinoyloxy-9-fluorpregna-1,4-diene-3,20-dione.

24. Steroid according to claim 1, which is 16α,17α-(2'-hydrogen-2'-n-propyl)methylenedioxy-11β-hydroxy-21-valeroyloxy-9-fluorpregna-1,4-diene-3,20-dione.

25. Steroid according to claim 1, which is 16α,17α-(2'-hydrogen-2'-n-propyl)methylenedioxy-11β-hydroxy-21-nicotinoyloxy-6α,9-difluorpregna-1,4-diene-3,20-dione.

26. Steroid according to claim 1, which is 16α,17α-(2'-hydrogen-2'-n-heptyl)methylenedioxy-pregna-1,4-diene-11β,21-diol-3,20-dione.

27. Steroid according to claim 1, which is 16α,17α-(2'-hydrogen-2'-n-nonyl)methylenedioxy-pregna-1,4-diene-11β,21-diol-3,20-dione.

28. Steroid according to claim 1, which is 16α,17α-(2'-hydrogen-2'-n-propyl)methylenedioxy-11β-hydroxy-21-nicotinoyloxypregna-1,4-diene-3,20-dione.

29. Steroid according to claim 1, which is 16α,17α-(2'-hydrogen-2'-n-heptyl)methylenedioxy-6α,9-difluoropregna-1,4-diene-11β,21-diol-3,20-dione.

* * * * *